United States Patent
Wei et al.

(10) Patent No.: US 11,866,559 B2
(45) Date of Patent: Jan. 9, 2024

(54) FAST FABRICATION OF FIBER REINFORCED POLYMERS USING SOLID EPOXY POWDER CONTAINING AN INITIATOR

(71) Applicant: PALO ALTO RESEARCH CENTER INCORPORATED, Palo Alto, CA (US)

(72) Inventors: Junhua Wei, Palo Alto, CA (US); Gabriel Iftime, Newark, CA (US); Michael Benedict, Palo Alto, CA (US); Mahati Chintapalli, Moutain View, CA (US)

(73) Assignee: XEROX CORPORATION, Norwalk, CT (US)

( * ) Notice: Subject to any disclaimer, the term of this patent is extended or adjusted under 35 U.S.C. 154(b) by 306 days.

(21) Appl. No.: 17/147,217

(22) Filed: Jan. 12, 2021

(65) Prior Publication Data
US 2022/0220267 A1 Jul. 14, 2022

(51) Int. Cl.
*C08K 3/36* (2006.01)
*C08J 5/24* (2006.01)
*C08K 3/34* (2006.01)
*C08K 3/04* (2006.01)
*C08L 101/00* (2006.01)

(52) U.S. Cl.
CPC ............... *C08J 5/243* (2021.05); *C08K 3/042* (2017.05); *C08K 3/346* (2013.01); *C08K 3/36* (2013.01); *C08L 101/00* (2013.01); *C08J 2363/00* (2013.01)

(58) Field of Classification Search
CPC ....... C08J 5/243; C08J 2363/00; C08K 3/042; C08K 3/346; C08K 3/36; B29B 7/005; B29B 7/286; B29B 7/90; B29B 7/94; B29B 2009/125; B29B 9/02; B29B 9/14; B29C 70/465
USPC .......................................................... 264/137
See application file for complete search history.

(56) References Cited

U.S. PATENT DOCUMENTS

| 5,935,508 A | * | 8/1999 | Fernyhough | ............ B29C 48/91 264/495 |
| 2009/0311487 A1 | * | 12/2009 | Filsinger | ............... B29C 70/086 156/169 |
| 2018/0243978 A1 | * | 8/2018 | Nguyen | ................. B33Y 10/00 |

OTHER PUBLICATIONS

Epoxy Resins in Wind Energy Applications, Epoxy Resin Committee, Jul. 2015, 4 pages, found at https://epoxy-europe.eu/wp-content/uploads/2015/07/epoxy_erc_bpa_whitepapers_wind-energy-2.pdf.
D3039, "Standard Test Method for Tensile Properties of Polymer Matrix Composite Materials," ASTM International, Dec. 2002, 13 pages.

* cited by examiner

*Primary Examiner* — Hannah J Pak
(74) *Attorney, Agent, or Firm* — Miller Nash LLP

(57) ABSTRACT

A method of manufacturing includes producing a powder resin comprising a polymer precursor and a thermal initiator, packing a fiber structure with the powder resin, resulting in a resin-packed structure, and heating the resin-packed structure to a curing temperature high enough to melt and cure the resin-packed structure to form a final structure.

15 Claims, 2 Drawing Sheets

FAST FABRICATION OF FIBER REINFORCED POLYMERS USING SOLID EPOXY POWDER CONTAINING AN INITIATOR

TECHNICAL FIELD

This disclosure relates to manufacturing fiber reinforced polymers, more particularly to manufacturing fiber reinforced polymers using fast curing epoxy resins.

BACKGROUND

Fiber Reinforced Polymers or Plastics (FRPs) are widely used today for fabrication of lightweight structures. They offer high mechanical properties per weight. However, they have the disadvantage of a high cost. Expensive fibers and the low manufacturing cycle time contribute the most cost. The major research in the FRPs field focuses on the low cost fiber or using less fiber in the FRPs. Few efforts have been made to reduce the cycle time which is essential for mass production.

One can think of FRP fabrication as divided into three steps of shaping, curing, and post treatment. Depending on the different technologies used in the manufacturing, the shaping step has variable approaches. In general, during the shaping approach, the fiber fabrics undergo a process referred to as "layup." Typically, a layup process involves arranging dry components into the mold. After that, shaped fiber fabrics are infilled with polymer during a curing step. The curing step ensures high performance of the FRPs. However, it also causes the bottleneck of FRPs manufacturing.

To fabricate a good FRP part, polymer needs to fill the gaps between fibers in the fabrics to provide enough stress transferring. The polymer needs to be liquid enough to wet all the fibers in the size of 5-10 micron. After the polymer solidifies, the polymer needs to be strong and stiff enough to transfer stress between fibers. To achieve these requirements, thermoset polymer monomers, especially epoxy monomers, are the top picks. With the surface sizing on the fiber, the low viscosity epoxy monomers could wet the entire fiber fabrics. After curing, the thermoset material provide good stiffness. The key issue to apply it into mass production is that the curing of the thermoset requires hours of time which slows down the FRP manufacturing cycle time.

Some approaches to reduce the cycle time use fast curing epoxy resins. For example, in a high pressure resin transfer molding approach (HP-RTM), the liquid resin is pumped into the shaped fabrics under strong pressure and then used rapidly. Another approach is wet compressive molding (WCM). In this approach, resin is poured onto the shaped fabrics in the mold and impregnated and cured in the hot compressive mold. Both approaches require special equipment and molds need to transfer the resin into the mold and cure it onsite. To achieve the smallest cycle time, the resin is very active. The mold is already in its best curing condition when the resin is impregnated into the fibers. The major drawback of using HP-RTM and WCM and similar technology that use fast curing resin lies in limits on the thickness of resin penetration. The resin only penetrates to the millimeter level. The process also uses highly complex molds. These drawbacks limit use of FRPs in mass manufacturing.

SUMMARY

According to aspects illustrated here, there is provided a method of manufacturing including producing a powder resin comprising a polymer precursor and a thermal initiator, packing a fiber structure with the powder resin, resulting in a resin-packed structure, and heating the resin-packed structure to a curing temperature high enough to melt and cure the resin-packed structure to form a final structure.

DETAILED DESCRIPTION OF THE EMBODIMENTS

The embodiments here involve a composition of matter and a fabricating procedure for fiber reinforced polymers (FRPs). Some embodiments relate to a process of impregnating a fiber structure, with or without a mold, with a polymer. The polymer results from using a solid resin powder containing one or more polymer precursors and a thermal initiator to form a polymer matrix.

The composition of matter embodiments comprise a resin powder that is solid at room or other environmental temperature. This makes it safe and easy for storage, transport, and transferring. As used here, the term "resin" means a solid or highly viscous substance that can be converted into polymers. Some of the embodiments here involve using a sprayable resin powder in between layers of fibers to form a part or object being manufactured.

By using the solid resin where distribute the powder resin next to the fibers before melting and curing, the path length of resin to impregnate the fibers is very short, especially compared with RTM (resin transfer molding) or WCM (wet compression molding). A short path length has the benefit of enabling thick FRP structures. At the same time, because it is a dry process that may use pre-preg fabrics, large and complex FRP structure can be made. FRPs made by solid epoxy has clear advantages from using solid oligomer epoxy instead of liquid monomer, including higher crosslink density from the use of novolacs epoxy. Finally, due to the controllable viscosity from heating and short path length, using solid resin allows high filler loading of the fibers. This increases the performance of FRPs, The curing may occur at a temperature above the $T_g$ or the $T_m$ of the polymer precursor or the initiator activating temperature. As used here the term $T_g$ means the glass transition temperature, a temperature at which the substance transitions from a glass-like, rigid solid to a more flexible, rubbery compound. The term $T_m$ as used here means the melting temperature, wherein the substance goes from a solid to a liquid state. As used here, the term "melting" means changing from a high viscosity or solid state to a lower viscosity or liquid state, where the resin can flow and wet the fibers.

Figure 1:
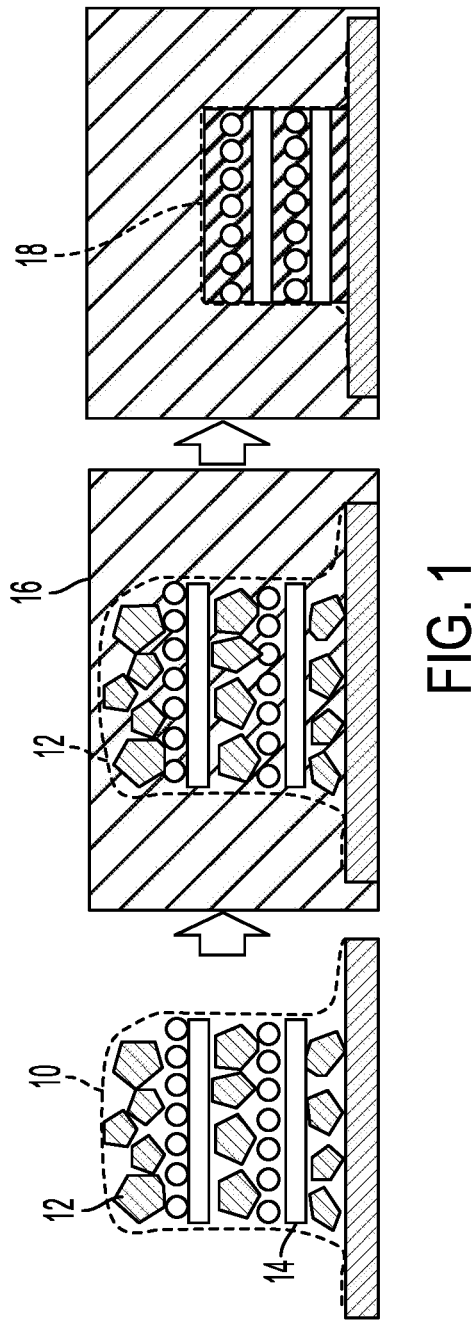
FIG. 1 shows an embodiment of a method of manufacturing fiber reinforced polymers.

FIG. 1 shows an embodiment of a process to manufacture items out of FRPs. The process starts with the fibers. On the left side of the diagram, the process involves repeatedly performing layup of layers of fibers 14, and spraying the fibers with the powder resin 12. This may be repeated as many times as necessary. The process may occur within a mold 10, or freestanding. Other options include rolling, spreading or otherwise applying the powder resin over the fiber structure during the layup process instead of spraying. The resulting structure may be considered a pre-preg structure. Besides these methods of applying dry powder resin over the fiber structure, methods using none or little soluble liquid as mediums to delivery powder resin can also be used here, like aerosol spray, brushing, et al.

After the layup and spraying process completes, the mold or structure is inserted into a heating chamber or oven 16. The heat causes both a phase change, the melting of the semi-crystal structure or transition from a glassy to rubbery state, and curing of the polymer. One embodiment heats the chamber to at least 160° C., but temperatures may be as low as 60° C. The polymer melts into and wets the fiber. The resin powder allows for the wetting and curing of the fiber in a matter of minutes rather than hours. The fully curing of the polymer precursor will typically finish during the curing step, but could also finish during post treatment. The left side of the diagram shows the resulting part, or object being manufactured 18.

Many variations and modifications exist and fall within the scope of the claims. In addition to the resin powder comprising polymer precursor and its thermal initiator, the process may use other material sets, such as a solid AB system. This may include solid epoxy with solid amine or anhydride, for example, could also work for this concept of using the phase transfer to freeze the structure. Either a premixed resin powder containing the right ratio of the A component and B component or individual A powder resin and B powder resin are mixed according to the right ratio can be used. Examples may include the powder having two components, either the solid powder with a second component, such as a solid epoxy with one of solid amine or anhydride, a powder resin that contains both epoxy and one of either amine or hydride, and two powder resins wherein one contains epoxy and one contains one of either amine or anhydride but mixed for packing. In these examples, one of the components may melt at a lower temperature than the other component, allowing that component to wet and infiltrate the fibers before the other component melts and starts the curing.

The size of the powder resin particles range from single digit micron to hundred microns as the largest dimension, with no restriction on shape or distribution.

The fiber structure may have a particular shape or structure that may include a single fiber, a tow of fiber, and a fabric having a pattern of at least one of a unidirectional pattern, a 1×1 pattern, a 2×2 twill weave pattern, a 4 Harness-Satin pattern, a 5 Harness-Satin pattern, an 8 Harness-Satin pattern, and a 4×4 twill weave pattern.

Suitable solid epoxy may have a melting or softening temperature in a range from 40° C. to 160° C. Examples of suitable solid epoxies at room temperature include products such as EPON® 1001F, EPON® 1004F, EPON® 1007F, and novolak epoxies. Novalak epoxies are low molecular weight polymers typically derived from phenols and formaldehyde. The EPON® resins are examples of solid resins derived from liquid epoxy and bisphenol-A.

In the case of an epoxy system, the initiator may comprises one or more substances to cause the polymerization reaction. These include, but are not limited to: 1-ethyl-3-methylimidazolinium dicyanamide; 1-butyl-3-methyl imidazolium tetrafluoroborate, and didecyldimethylammonium tetrafluoroborate, 1-methyltheobromine tetrafluoroborate, didecyldimethylammonium theobrominate, didecyldimethylammonium theophyllinate.

Alternatively, with epoxy systems, a solid hardener may be used. In this case no additional curing initiator is needed. The solid amine may have a melting temperature from 40° C. to 180° C. Examples of suitable solid amines include 4,4'-Diaminodiphenyl sulfone, 4,4'-Diaminodiphenylmethane, 4,4'-Diaminodiphenyl sulfide, 3,3'-Methylenedianiline, phthalic anhydride.

Beside of the thermoset powder resin, thermoplastic powder could also be used in this process, like the PEEK (polyether ether ketone), polyester, vinyl ester, nylon, et. al. The composition of the resin powder may have a concentration in a range of 80-99.99 wt % of polymer precursor and 0.001 to 20 wt % of initiator.

In addition to the polymer and curing initiator, particle fillers, like clays, which include nanoclays, graphene, fume silica, could also be sprayed together with the resin powder for a composite polymer matrix. The filler could be sprayed separately or embedded within the resin particle.

In addition to the spraying or rolling, electrostatic deposition or other deposition methods could be used to uniformly distribute resin particle set into carbon fiber fabric. Optionally, a process could be used to densify the powder resin, by applying pressure, using a roller or other methods.

In another embodiment, the powder resin could be carried in a liquid. The liquid should evaporated during or right after delivering the powder resin to the fabric. The resin should not or little dissolve the powder resin and the initiator. The application of the liquid system could occur by a variety of methods including aerosol spray, vacuum spray, capillary infiltration, et, al. In addition to oven heating, other heating systems or energy input could be used to melt resin powders and initiate reaction.

EXAMPLE

In this example, the resin powder is made by using 95 wt % of epoxy monomer EPON 1007F as the polymer precursor and 5 wt % of 1-ethyl-3-methylimidazolinium dicyanamide as thermal initiator. 95 grams of EPON® 1007F and 5 gram initiator were added into 500 ml of acetone. The mixture was mixed by magnetic stir overnight. Then, the acetone was removed from the mixture by distill and further dried at vacuum oven at 45° C. The solid was then put in the jar of a homogenizer and poured with liquid nitrogen. After the majority of the liquid nitrogen evaporated, use the homogenizer to grind it into small powders. The powders were further collected by using a series of sieve from 500 micron opening to 45 micron opening. The sieved powders were collected and named as resin powder. The plain epoxy powder was made by directly cryo-grinding raw EPON 1007F solid.

Characterization of the resin powder under a microscope determined that the powder were generally smaller than 45 microns, with wide size distribution. The powder have random shapes.

Figure 2:
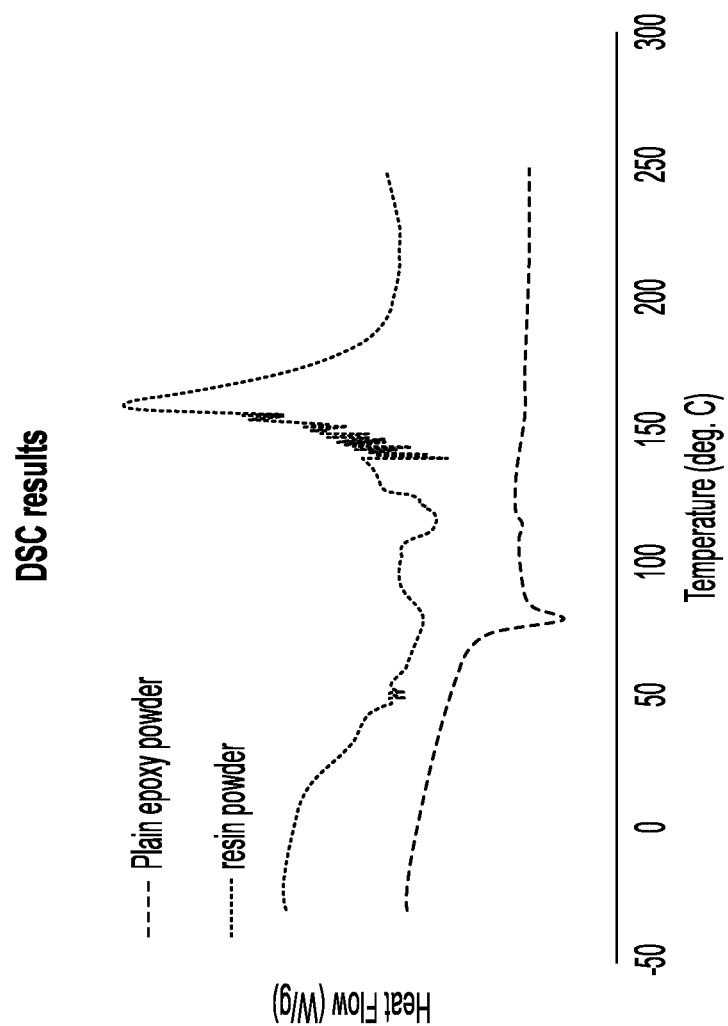
FIG. 2 shows a graph of characterization of plain epoxy versus an embodiment of resin powder.

Differential scanning calorimetry (DSC) also characterized the resin powder. As seen in FIG. 2, plain epoxy powder presents a clear $T_g$ around 80° C. The $T_g$ of resin powder is unclear due to the previous solvent and heat treatment. However, there is a clear exothermal peak in resin powder around 160° C. which is from the initiation of the curing. As suggested by the microscope image and DSC, oven heating above 160° C. and vacuum compressing were used to trigger melting and curing and counter the shrinkage from resin powder melting.

In this example, a flat CFRP panel was made by using previous described resin powder and carbon fiber fabric, in this example plain tween T300. First, the resin powder was sprayed onto the flat mold. Then a carbon fiber (CF) fabric was laid onto the mold with resin powder. More resin powder was sprayed onto the fabric and rolled. The steps of laying up fabrics and spraying resin powder were repeated multiple times until desired layer number reached. In this example, 8 layers were piled up. After that, protective layers, like peel ply, absorber, upper mold, vacuum bag, were piled. Vacuum was provided then. Finally, the setup was moved to a preheated oven at 190° C. for 15 hours.

Example 2

This example is the same as Example 1, except that the setup was moved to the pre-heated oven for only 15 minutes.

Results

The CFRP was characterized by tensile test according to ASTM D3039, "Standard Test Method for Tensile Properties of Polymer Matrix Composite Materials." Briefly, the cured panel was removed from the oven and air cooled to room temperature under vacuum. The panel was then cut by a water-cooled diamond saw into desired shape. Tabs made by glass fiber reinforced plastics was glued onto the ends of the specimens by 6 hours of curing at 75° C.

Table 1 summarized the tensile results. There are little differences between the 15 hour cure and the 15 minutes on mechanical properties. It suggested that both panels were fully cured while one is on the mold at 190° C. and another is during post treatment at 75° C. No shape change was found during the post treatment.

TABLE 1

Mechanical properties

| Sample | Modulus GPa | Strength MPa |
| --- | --- | --- |
| CFRP-15 hr | 44.76 (5.35) | 387.02 (47.02) |
| CFRP-15 min | 48.12 (5.35) | 366.38 (29.13) |

When the FRP is removed from the mold, the $T_g/T_m$ maintains the shape of the polymer precursor as well as the curing. All known current manufacturing approaches only rely on the curing of the polymer precursor. This change accelerates the use of rate of the mold and further increase the total cycle time.

In the embodiments, the use of solid resin and relying upon the formation of polymers instead of just the curing, one can produce objects from FRPs in much less time. Further, this affords the ability to make complex shapes, large structures, and thick samples and in some applications, a process could adapt to produce gradient structures with selective spraying of the resin powder.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of manufacturing fiber reinforced polymers comprising:
   producing a powder resin comprising a polymer precursor and a thermal initiator, wherein the powder resin is produced by mixing an epoxy monomer as the polymer precursor in a concentration range of 80-99.99 wt % and thermal initiator in a concentration range of 0.001-20 wt %;
   packing a fiber structure with the powder resin resulting in a resin-packed structure by one or more of repeatedly spraying the powder resin onto a layer of the fiber structure and adding layers, densifying the powder resin, electrodepositing the powder resin, and rolling the powder resin over the fiber structure; and
   heating the resin-packed structure to a curing temperature high enough to melt and cure the resin-packed structure to form a final structure.

2. The method as claimed in claim 1, wherein producing a powder resin comprises:
   mixing the polymer precursor and the thermal initiator in a solvent to form a mixture;
   removing the solvent and drying the mixture to form a solid;
   grinding the solid to produce powder resin.

3. The method as claimed in claim 1, further comprising adding protective layers to the fiber structure.

4. The method as claimed in claim 1, wherein the fiber structure comprises a pre-formed fiber structure.

5. The method as claimed in claim 1, wherein the fiber structure comprises at least one mat and the method further comprises shaping the resin-packed structure either prior to or during the heating.

6. The method as claimed in claim 5, wherein shaping the resin-packed structure comprises vacuum and autoclave compressing the resin-packed structure.

7. The method as claimed in claim 1, wherein heating the resin-packed structure comprises heating the resin-packed structure in a chamber at a temperature of at least 60° C.

8. The method as claimed in claim 1, wherein producing the resin powder comprises producing one selected from the group consisting of: solid epoxy with solid amine and solid epoxy with anhydride.

9. The method as claimed in claim 1, wherein producing the resin powder comprises producing one selected from the group consisting of: thermoplastic polyurethane powder, polyether powder, vinyl ester powder, and nylon powder.

10. The method as claimed in claim 1, wherein the powder resin is comprised of particles having a size in the range of 1 μm to 500μ.

11. The method as claimed in claim 1, wherein the powder resin comprises two components in a combination, wherein the combination comprises one of: a solid epoxy with one of solid amine or anhydride, a powder resin containing both epoxy and one of either amine or anhydride, or two powder resins wherein one contains epoxy and one contains one of either amine or anhydride but mixed for packing.

12. The method as claimed in claim 11, wherein the melting point of a first of the two components is lower than the melting point of a second of the two components is such that the first component wets and infiltrates the fiber structure before the second component melts to start the curing.

13. The method as claimed in claim 1, wherein producing the resin powder comprises adding particle fillers to the polymer precursor and the thermal initiator.

14. The method as claimed in claim 13, wherein the at least one particle filler comprises at least one selected from the group consisting of: clay, graphene, and fumed silica.

15. The method as claimed in claim 1, wherein the fiber structure has a shape that is one of a single fiber, a tow of fiber, and a fabric having a pattern of at least one of a unidirectional pattern, a 1×1 pattern, a 2×2 twill weave pattern, a 4 Harness-Satin pattern, a 5 Harness-Satin pattern, an 8 Harness-Satin pattern, and a 4×4 twill weave pattern.

* * * * *